(12) United States Patent
Janssen et al.

(10) Patent No.: US 7,724,627 B2
(45) Date of Patent: May 25, 2010

(54) ENCODER SPOKES DETECTION PRIOR TO FORMING IMAGE ON OPTICALLY WRITABLE LABEL SURFACE OF OPTICAL DISC

(75) Inventors: Matthew J. Janssen, Corvallis, OR (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

(21) Appl. No.: 11/738,506

(22) Filed: Apr. 22, 2007

(65) Prior Publication Data

US 2008/0261809 A1    Oct. 23, 2008

(51) Int. Cl.
G11B 27/36 (2006.01)
(52) U.S. Cl. ............... 369/53.41; 369/53.13; 369/53.2; 369/53.43
(58) Field of Classification Search .............. 369/47.38, 369/47.46, 47.47, 53.13, 53.3, 53.42, 53.43, 369/53.41, 59.17, 59.18, 59.23
See application file for complete search history.

(56) References Cited

U.S. PATENT DOCUMENTS

| | | | |
|---|---|---|---|
| 4,833,664 A * | 5/1989 | Shiragami et al. | 369/53.32 |
| 7,015,939 B2 | 3/2006 | Honda | |
| 7,483,047 B2 * | 1/2009 | Huang et al. | 369/47.1 |
| 7,596,067 B2 * | 9/2009 | Hanks et al. | 369/53.1 |
| 2006/0126474 A1 | 6/2006 | Hanks | |
| 2006/0262660 A1 * | 11/2006 | Han | 369/1 |
| 2007/0140077 A1 * | 6/2007 | Kang et al. | 369/44.29 |

FOREIGN PATENT DOCUMENTS

| | | |
|---|---|---|
| EP | 1930893 | 6/2008 |
| KR | 10-2003-0079174 A | 10/2003 |
| WO | 2007026813 A1 | 3/2007 |

OTHER PUBLICATIONS

International Search Report for Patent Application PCT/US2008/060898; Jul. 28, 2008.

* cited by examiner

Primary Examiner—Thang V Tran

(57) ABSTRACT

Whether an optically writable label surface of an optical disc is suitable for having an image formed thereon is determined. A detectable number of encoder spokes on a control feature area of the optical disc is counted as the optical disc is rotated. Where the detectable number of encoder spokes is other than a predetermined value, an error condition with respect to the optically writable label surface of the optical disc is indicated.

20 Claims, 7 Drawing Sheets

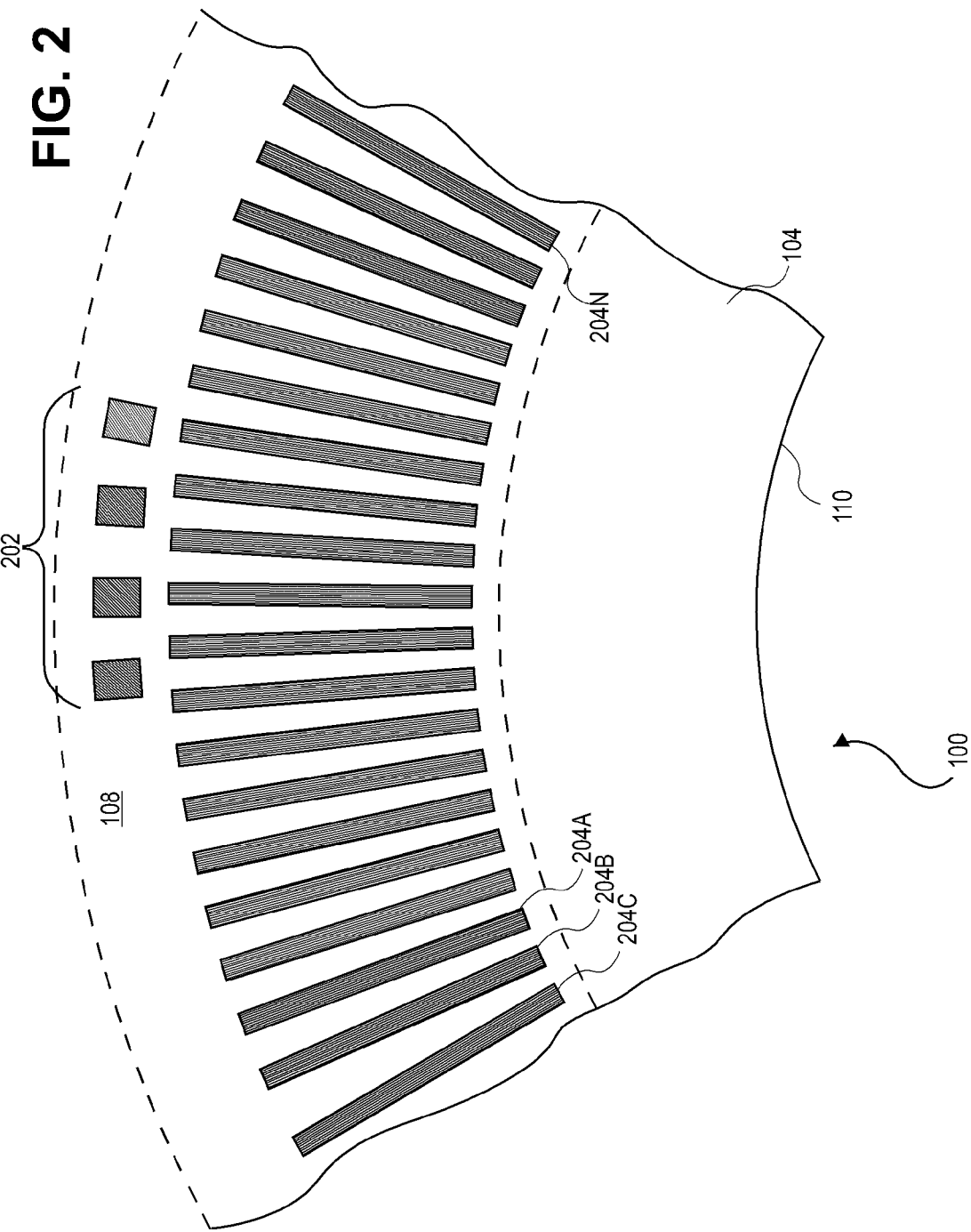

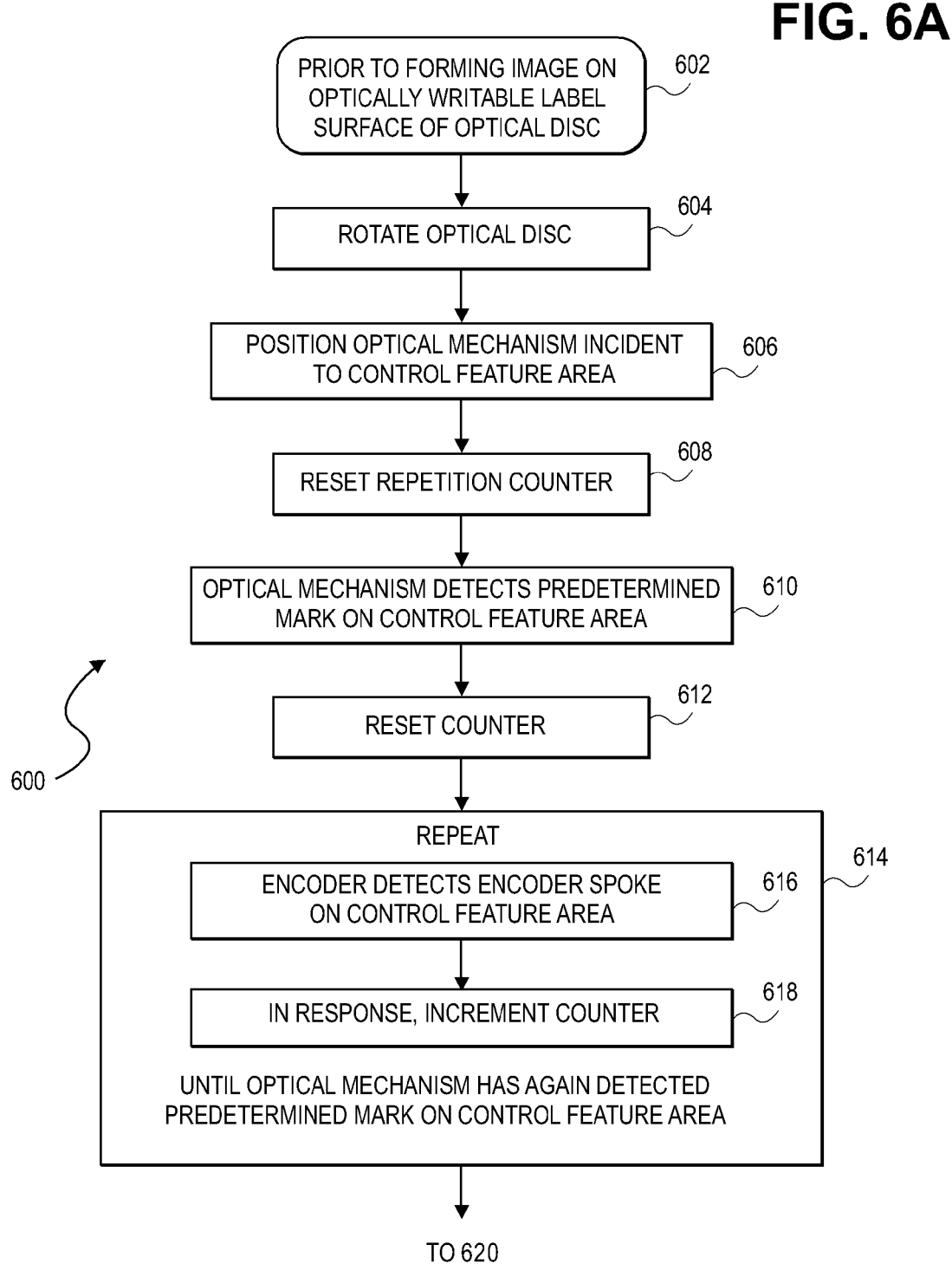

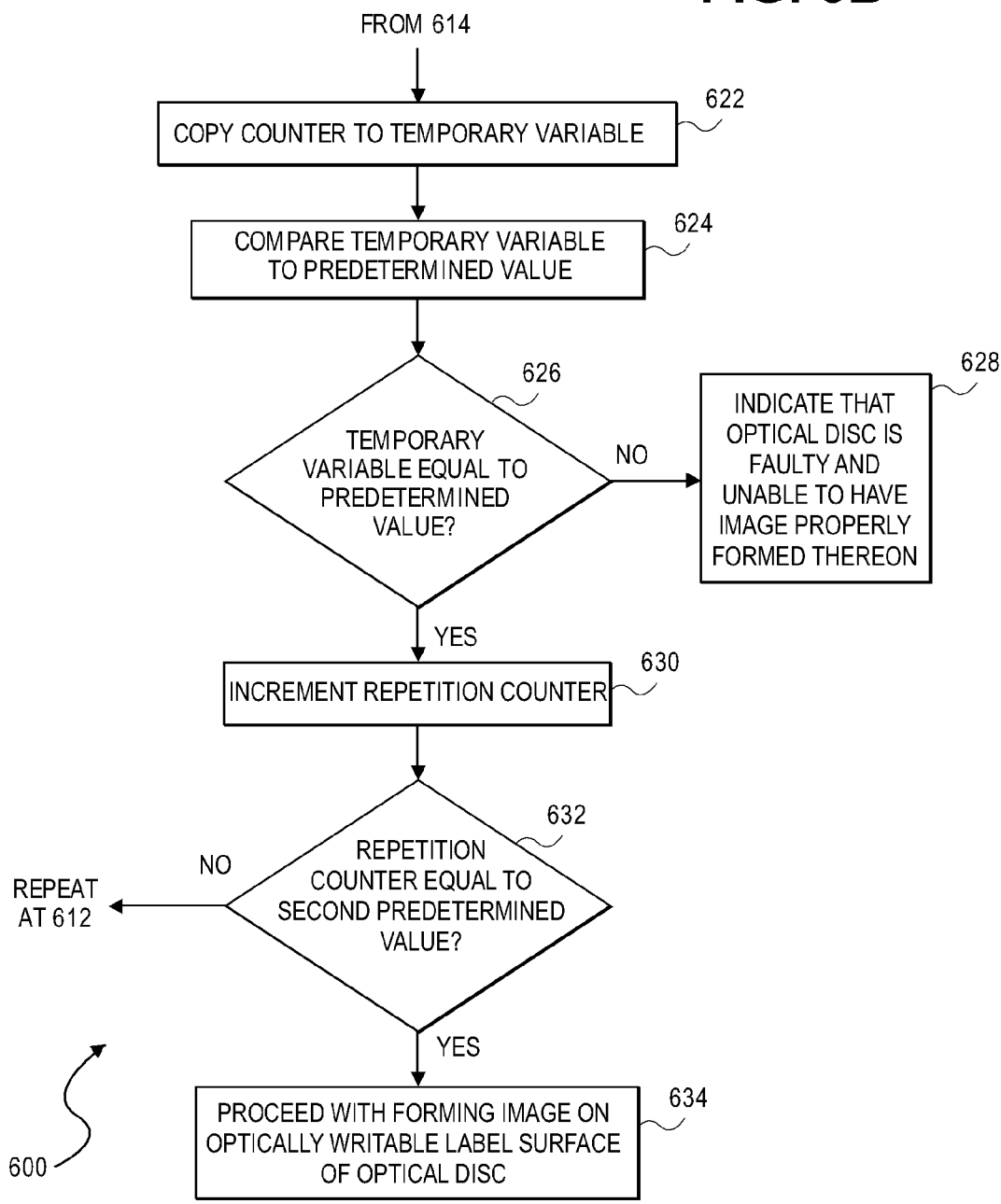

ENCODER SPOKES DETECTION PRIOR TO FORMING IMAGE ON OPTICALLY WRITABLE LABEL SURFACE OF OPTICAL DISC

BACKGROUND

Some types of optical discs permit end users to optically write data on optically writable data surfaces of the optical discs. For example, users may be able to store data on the optical discs for later retrieval. Such data may include computer files, images, music, and other types of data. However, historically, users have had to label the optical discs using markers, which yields unprofessional results, or affix labels to the label sides of the optical discs, which can be laborious.

More recently, users have been able to form images directly on the label sides of optical discs, using optical discs that have optically writable label surfaces. The users employ optical disc devices that are able to optically write to such label surfaces of optical discs. For example, the previously filed patent application entitled "Integrated CD/DVD Recording and Label", filed on Oct. 11, 2001, assigned Ser. No. 09/976,877, and published as US published patent application no. 2003/0108708, describes an optical disc having such an optically writable label surface.

Some types of optical discs having optically writable label surfaces have preformed or pre-imaged encoder spokes on areas of the optical discs. While such an optical disc is being rotated, the encoder spokes are detected so that the relative angular position of the optical disc currently incident to an optical mechanism that forms an image on the optically writable label surface of the optical disc is known. However, if these encoder spokes are not able to be detected, the resulting image on the optically writable label surface of the optical disc may be skewed, or suffer from other defects.

This can be frustrating to the end user, since forming an image on the optically writable label surface of an optical disc can take quite some time. Thus, the user may have to wait a relatively long length of time for an image to be formed on the optically writable label surface of the optical disc. Only upon completion of the image formation process may the user then learn that the image was not properly formed on the optically writable label surface of the optical disc.

BRIEF DESCRIPTION OF THE DRAWINGS

FIG. 2 is a diagram of the control feature area of an optical disc in detail, according to an embodiment of the invention.

FIGS. 6A and 6B are flowcharts of a method that is consistent with but more detailed than the method of FIG. 4, according to an embodiment of the invention.

DETAILED DESCRIPTION OF THE DRAWINGS

Figure 1:
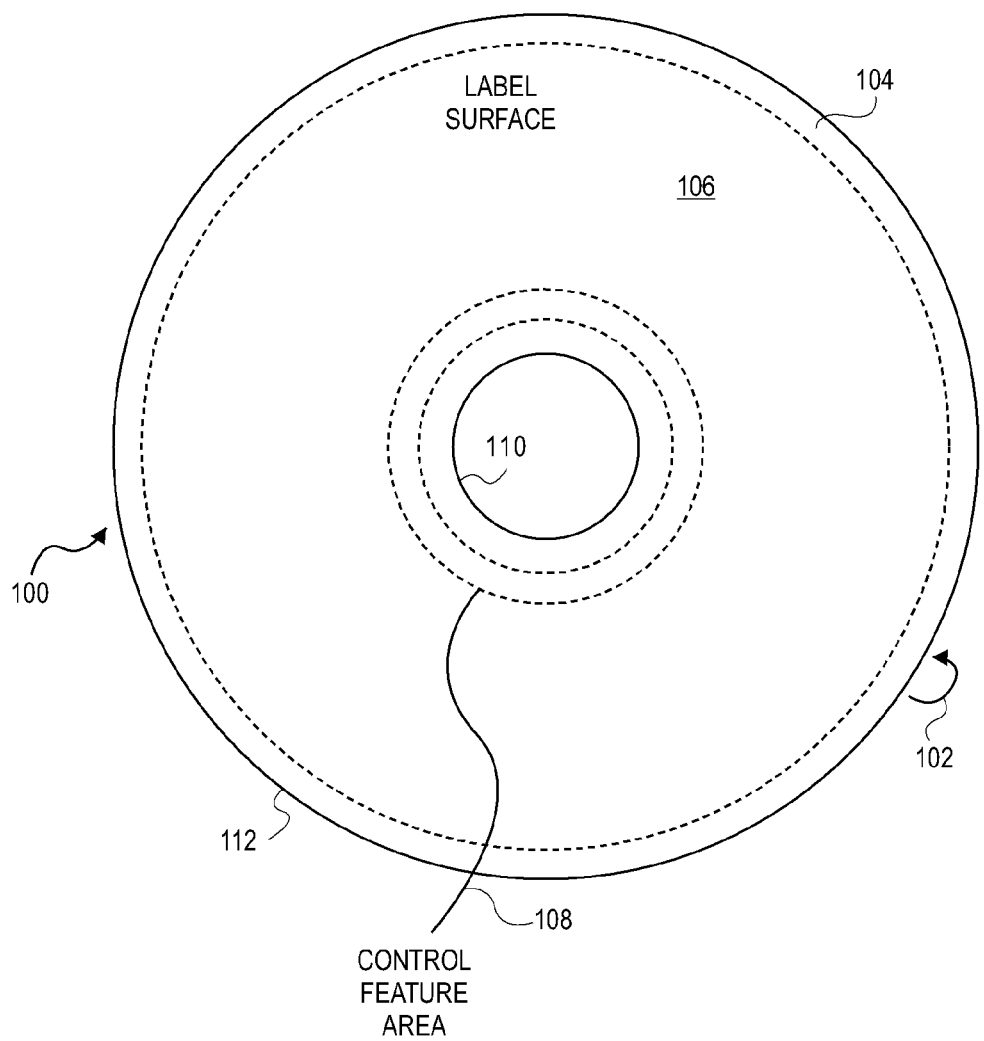
FIG. 1 is a diagram of an optical disc having an optically writable label surface and a control feature area, according to an embodiment of the invention.

FIG. 1 shows an optical disc 100, according to an embodiment of the invention. The optical disc 100 includes an optically writable data side 102, which is the side that is not shown in FIG. 1, and an optically writable label side 104, which is the side that is shown in FIG. 1. The optical disc 100 includes an inside edge 110 and an outside edge 112. The optically writable label side 104 includes an optically writable label surface 106 and a control feature area 108, the latter being close to the inside edge 110 in the embodiment of FIG. 1.

The optically writable data side 102 of the optical disc 100 includes a data region on which data may be optically written to and/or optically read by the optical disc device 100. The data side 102 is thus the side of the optical disc 100 to which binary data readable by the optical disc device 100 and understandable by a computing device is written, and can be written by the optical disc device 100 itself. For instance, the data side 102 may be the data side of a compact disc (CD), a CD-readable (CD-R), which can be optically written to once, a CD-readable/writable (CD-RW), which can be optically written to multiple times, and so on.

The data side 102 may further be the data side of a digital versatile disc (DVD), a DVD-readable (DVD-R), or a DVD that is readable and writable, such as a DVD-RW, a DVD-RAM, or a DVD+RW. The data side 102 may also be the data side of a high-capacity optical disc, such as a Blu-ray optical disc, a High Definition (HD) DVD optical disc, and so on. Furthermore, there may be a data region on each side of the optical disc 100, such that the optical disc is double sided, and such that there is a label region on at least one of the sides of the disc.

The label side 104 is the side of the optical disc 100 to which visible markings can be optically written on the optically writable label surface 106 thereof to realize a desired label image. For instance, the label side 104 may be part of an optical disc that is described in the previously filed patent application published as US published patent application no. 2003/0108708, which describes an optically writable label side of an optical disc. It is noted that in other embodiments at least one of the sides 102 and 104 of the optical disc 100 may have both label regions and data regions.

The control feature area 108 includes features that describe the optically writable label surface 106 of the optical disc 100, and/or that are used during image formation on the label surface 106 to properly form a desired image on the label surface 106. The control feature area 108 may thus include features to calibrate an optical mechanism of the optical disc device in which the optical disc 100 has been inserted, for optimal image formation on the label surface 106. The control feature area 108 may include a media identification pattern indicating the type of the label surface 106, information regarding which is then used for optimal image formation on the label surface 106. The control feature area 108 may further include encoder spokes as well as other features.

FIG. 2 shows a portion of the control feature area 108 of the label side 104 of the optical disc 100 in detail, according to an embodiment of the invention. The control feature area 108 is depicted in FIG. 2 as including an index mark 202, and a number of encoder spokes 204A, 204B, 204C, . . . , 204N, collectively referred to as the encoder spokes 204. The control feature area 108 may include other features, in addition to and/or in lieu of the index mark 202 and the encoder spokes 204, such as calibration features, media identification patterns, and so on, as can be appreciated by those of ordinary skill within the art.

The index mark 202 includes a number of rectangular marks, and around the circumference of the control feature area 108 on the label side 104 of the optical disc 100, occurs once. Thus, detection of the index mark 202 by an optical disc device enables the optical disc device to know that one complete revolution of the optical disc 100 has occurred while the optical disc 100 is being rotated within the optical disc device. The index mark 202 may have other functionality as well, as can be appreciated by those of ordinary skill within the art.

The encoder spokes 204 are equally spaced rectangular marks around the circumference of the control feature area 108 on the label side 104 of the optical disc 100. In one embodiment, for instance, there may be 400 of such encoder spokes 204. The encoder spokes 204 are detected by an encoder of the optical disc device that may be permanently position incident to the control feature area 108, while the optical disc 100 is being rotated within the optical disc device 100. By detection of the encoder spokes 204, the optical disc device knows how much the optical disc 100 has angularly moved. As such, the current angular position of the optical disc 100 is known, so that an image is properly formed on the optically writable label surface 106 on the label side 104 of the optical disc 100.

As has been described in the background section, if the encoder spokes 204 are not able to be properly detected, improper image formation on the optically writable label surface 106 on the label side 104 of the optical disc 100 can result. The optical disc device in which the optical disc 100 has been inserted may know a priori that adjacent encoder spokes are separated from one another by a predetermined distance, such that this distance is used to determine where marks should be written on the label surface 106 to form an image on the label surface 106. As an extreme example, however, the encoder spokes between the spokes 204B and 204N—including the encoder spoke 204A—may not be able to be detected.

Therefore, when forming an image on the optically writable label surface 106 on the label side 104 of the optical disc 100, the optical disc device may after detecting the encoder spoke 204B believe that it is writing a mark on the label surface 106 at an angular position on the surface 106 corresponding to the encoder spoke 204A. However, because the next detected encoder spoke is actually the encoder spoke 204N in this example, the optical disc device actually writes a mark on the label surface 106 at an angular position on the surface 106 corresponding to the encoder spoke 204N. As a result, the image formed on the optically writable label surface 106 is skewed, which may be discovered by the user only after he or she has waited a substantially long length of time for the image formation process to be completed.

Figure 3A:
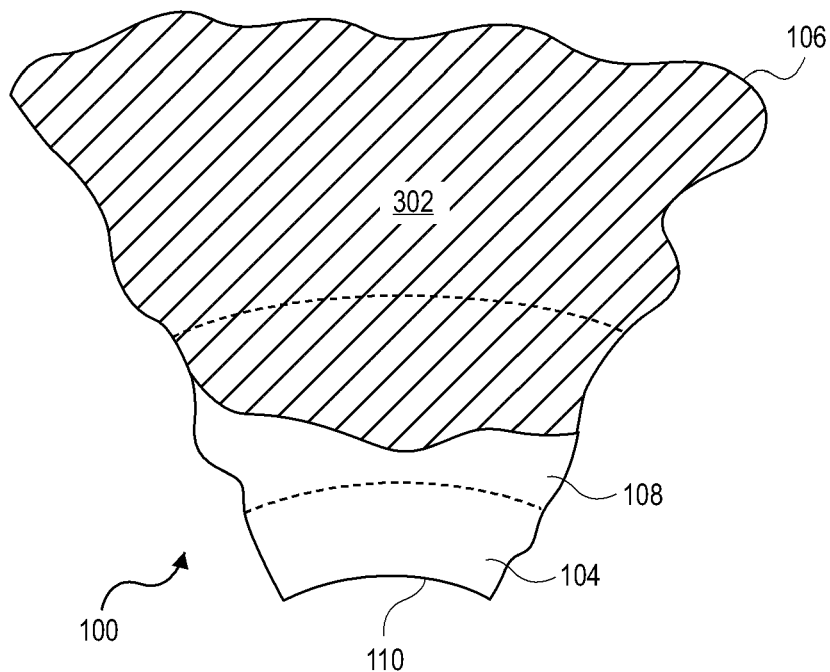
FIGS. 3A and 3B are diagrams depicting how encoder spokes of the control feature area of an optical disc that may not be able to be detected properly, which embodiments of the invention discern prior to an image being formed on the optically writable label surface of the optical disc.
Figure 3B:
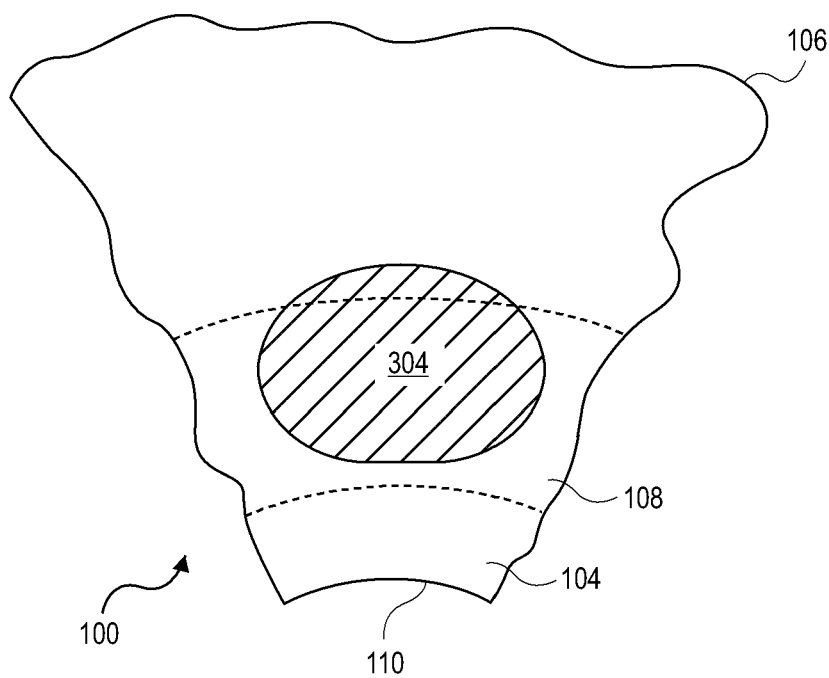

FIGS. 3A and 3B show portions of the control feature area 108 of the label side 104 of the optical disc 100, and how the control feature 108 can particularly have its encoder spokes 204 be unable to be detected, which embodiments of the invention can discern. For illustrative convenience, the encoder spokes 204 are not actually shown in FIGS. 3A and 3B. However, as has been described in relation to FIG. 2, the encoder spokes 204 occur over the circumference of the control feature area 108 over the label side 104 of the optical disc 100.

In FIG. 3A, a portion of the optically writable label surface 106 of the label side 104 of the optical disc 100 is depicted as including a dye 302. The dye 302 of the label surface 106 can be locally heated to change the color and/or contrast of the dye 302. In this way, an image is formed on the label side 104 of the optical disc 100. However, during formation of the optical disc 100, the dye 302 may improperly be extended into the control feature area 108. If the dye 302 of the label surface 106 extends too far into the control feature area 108, then the encoder spokes 204 within the control feature area 108 may not be able to be properly detected.

Other types of dye can also extend into the control feature area 108. For instance, the data dye that is used on the data side 102 of the optical disc 100 may cover a portion of the control feature area 108. As such, the encoder spokes 204 may not be able to be properly detected for this reason as well.

In FIG. 3B, a contaminant 304 has been placed on the label side 104 of the optical disc 100, including a portion of the optically writable label surface 106 and a portion of the control feature area 108. The contaminant 304 may be dirt, a fingerprint, or another type of contaminant. If the contaminant 304 has sufficiently covered one or more of the encoder spokes 204 with sufficient opacity, then these encoder spokes 204 within the control feature area 108 may not be able to be properly detected. Those of ordinary skill within the art can appreciate that there can be other ways by which the encoder spokes 204 may not be able to be properly detected, and that FIGS. 3A and 3B show just two examples.

Figure 4:
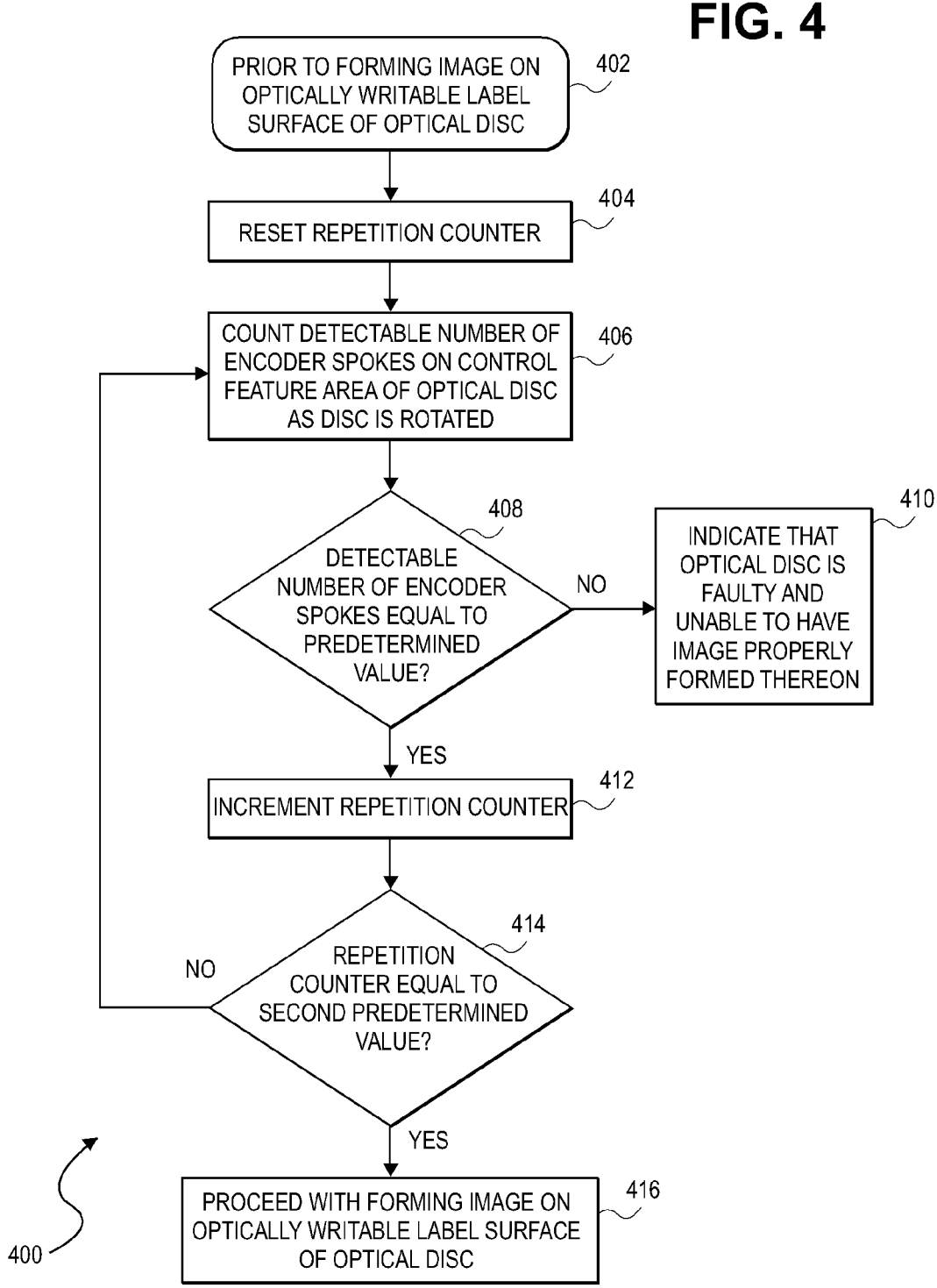
FIG. 4 is a flowchart of a method, according to an embodiment of the invention.

FIG. 4 shows a method 400, according to an embodiment of the invention. The method 400 is performed prior to forming an image on the optically writable label surface 106 of the label side 104 of the optical disc 100 (402). More generally, the method 400 is performed to determine whether an optically writable label surface of an optical disc is suitable for having an image formed on this label surface. A repetition counter may be reset (404). Thereafter, during a complete revolution of the optical disc 100, the number of detected encoder spokes 204 within the control feature area 108 of the optical disc 100 is detected as the optical disc 100 is rotated (406). This detected number of encoder spokes 204 is compared to a predetermined value, which may be the actual, already known number of encoder spokes 204 within the control feature area 108, or some portion thereof in one embodiment. (It is noted that the detected number of encoder spokes 204 is the number of the spokes 204 that are detectable, and thus this number may also be referred to as the detectable number of encoder spokes 204.)

If the detected number of encoder spokes is not equal to the predetermined value in question (408), then the method 400 indicates that the optical disc 100 is faulty, and is unable to have an image properly formed on the optically writable label surface 106 of the label side 104 thereof (410). Thus, the method 400 does not permit an image to be formed on the optically writable label surface 106 of the optical disc 100, since the image would be skewed, or have other defects. The user, therefore, does not have to wait what can be a substantially long period of time for image formation to occur—only to learn that the image was not properly formed on the optical disc 100. Rather, the method 400 is performed relatively quickly, and thus the user can learn relatively soon that the optical disc 100 will not permit an image to be properly formed thereon. More generally, part 410 indicates that an error condition has occurred within respect to the optically writable label surface of the optical disc.

By comparison, if the detected number of encoder spokes is equal to the predetermined value in question (408), then the repetition counter may be increased (412). If the repetition counter is not yet equal to a second predetermined value (414), then the method 400 repeats at 406. Once the repetition counter is equal to the second predetermined value (414), then the method 400 proceeds with forming an image on the optically writable label surface 106 of the label side 104 of the optical disc 100 (416). The second predetermined value may be equal to a number greater than one, such as between four and eight. As such, it is verified a number of times that the correct number of encoder spokes 204 is properly detected before concluding that an image can be properly formed on the optical disc 100, for sake of robustness.

In one embodiment, however, the number of encoder spokes that can be detected may be counted just once, instead of more than one time. In such an embodiment, parts 404, 412, and 414 may be omitted. That is, if the detectable number of encoder spokes is equal to the predetermined value in question in part 408, the method 400 in this embodiment immediately concludes that an image can be properly formed on the optical disc 100, and proceeds to part 416 to form the image on the optically writable label surface 106 of the label side 104 of the optical disc 100.

Figure 5:
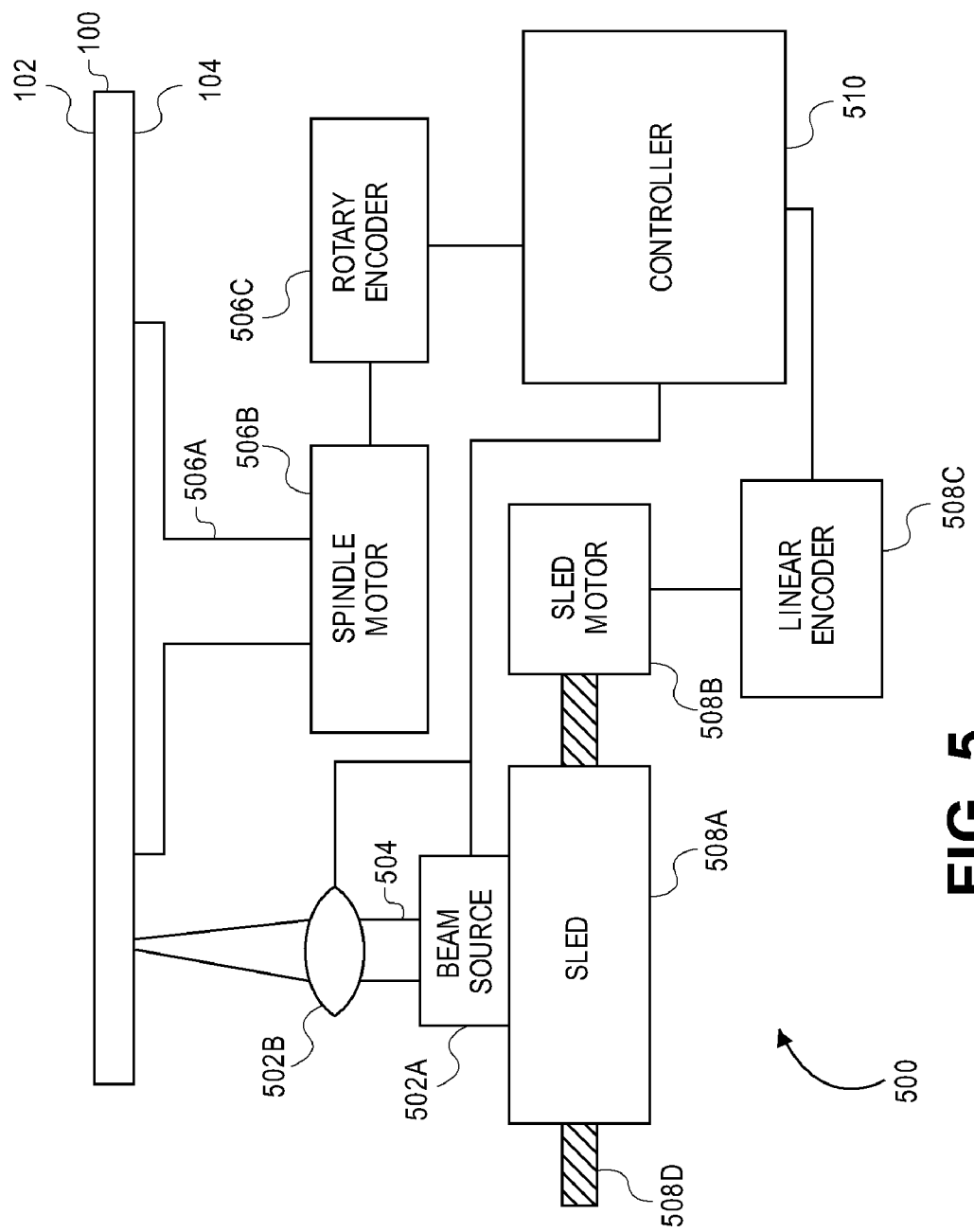
FIG. 5 is a diagram of an optical disc device, according to an embodiment of the invention.

FIG. 5 shows an optical disc device 500, according to an embodiment of the invention. The optical disc device 500 is for reading from and/or writing to the optical disc 100 inserted into the optical disc device 500 and that has been described. The optical disc device 500 includes a beam source 502A and an objective lens 502B, which are collectively referred to as the optical mechanism 502. For exemplary purposes only, the optically writable label side 104 of the optical disc 100 is depicted as being incident to the optical mechanism 502 in FIG. 5, such that the optical disc device 500 is or is about to optically write an image to the label side 104.

The optical disc device 500 also includes a spindle 506A, a spindle motor 506B, and a rotary encoder 506C, which are collectively referred to as the first motor mechanism 506. The rotary encoder 506C is specifically that which detects the encoder spokes 204 on the control feature area 108, and thus is that which determines the current angular position of the optical disc 100 as incident to the optical mechanism 502. In one embodiment, the encoder may include an optical emitter/optical receiver pair to detect the encoder spokes. The device 500 further includes a sled 508A, a sled motor 508B, a linear encoder 508C, and a rail 508D, which are collectively referred to as the second motor mechanism 508. The linear encoder 508C is that which permits positioning control of the sled 508A, and thus the optical mechanism 502, and therefore is that which determines the current radial position of the optical mechanism 502 incident to the optical disc 100. In some embodiments of the invention, one or more of these components may be omitted, such as specifically the linear encoder 508C.

The optical mechanism 502 focuses an optical beam 504 on the optical disc 100. Specifically, the beam source 502A generates the optical beam 504, which is focused through the objective lens 502B onto the optical disc 100. The first motor mechanism 506 rotates the optical disc 100. Specifically, the optical disc 100 is situated on the spindle 506A, which is rotated, or moved, by the spindle motor 506B to a given position specified by the rotary encoder 506C communicatively coupled to the spindle motor 506B. The rotary encoder 506C may include hardware, software, or a combination of hardware and software. In one embodiment, the rotary encoder 506C may be permanently positioned within the optical disc device 500 such that it is always incident to the control feature area 108 of the optical disc 100 when the disc 100 is inserted into the device 500, which is not specifically depicted in FIG. 5.

The second motor mechanism 508 moves the optical mechanism 502 radially relative to the optical disc 100. Specifically, the optical mechanism 502 is situated on the sled 508A, which is moved on the rail 508D by the sled motor 508B to a given position specified by the linear encoder 508C communicatively coupled to the sled motor 508B. The linear encoder 508C may include hardware, software, or a combination of hardware and software.

The optical disc device 500 further includes a controller 510. The controller 510 selects positions on the optical disc 100 at which the optical beam 504 is to be focused for optically writing to and/or optically reading from such positions, by controlling the optical mechanism 502 as well as the first motor mechanism 506 and the second motor mechanism 508. The optical mechanism 502 is able to control the beam 504 generated by the beam source 502A, the focusing of the beam 504 through the objective lens 502B, the spindle motor 506B through the rotary encoder 506C, and the sled motor 508B through the linear encoder 508C. The controller 510 may include hardware, software, or a combination of hardware and software. In one embodiment, the controller 510 may be or include firmware, as can be appreciated by those of ordinary skill within the art.

In one embodiment of the invention, the controller 510 determines whether the rotary encoder 506C is able to detect a predetermined number of the encoder spokes 204 on the control feature area 108 of the optical disc 100, prior to causing the optical mechanism 502 to form an image on the label side 104 of the optical disc 100. Thus, in this embodiment, the encoder 506C detects the encoder spokes 204 over a complete revolution of the optical disc 100. If the encoder 506C is unable to detect the predetermined number of encoder spokes 204, then the controller 510 prevents the optical mechanism 502 from forming the image on the optical disc 100. By comparison, if the encoder 506C is able to detect the predetermined number of encoder spokes 204 a predetermined one or more times, then the controller 510 permits (and causes) the optical mechanism 502 to form the image on the optical disc 100.

FIGS. 6A and 6B show a method 600, according to another embodiment of the invention. The method 600 is consistent with but more detailed than the method 400 of FIG. 4. Specifically, the method 600 achieves the same result as the method 400, in that it is determined whether a predetermined number of encoder spokes 204 can be reliably counted to permit proper formation of an image on the optically writable label surface 106 of the label side 104 of the optical disc 100. However, the method 600 is specifically described in relation to the optical disc device 500 of FIG. 5, unlike the method 400.

The method 600 is performed prior to forming an image on the optically writable label surface 106 of the label side 104 of the optical disc 100 (602). More generally, the method 600 is performed to determine whether an optically writable label surface of an optical disc is suitable for having an image formed on this label surface. The optical disc 100 is rotated by the first motor mechanism 506 of the optical disc device 500 (604). The optical mechanism 502 of the optical disc device 500 is positioned so that it is adjacent to the control feature area 108 of the optical disc 100 (606). For instance, the second motor mechanism 508 of the optical disc device 500 may move the optical mechanism 502 so that it is positioned in this way.

A repetition counter is reset (608), and in response to the optical mechanism 502 detecting a predetermined mark on the control feature area 108 (610), a counter is reset (612). The predetermined mark may be the index mark 202 that has been described, which occurs once on the circumference of the control feature area 108 around the optical disc 100. The counter that is reset in part 612 is different than the repetition counter that is reset in part 608, and is to count the number of encoder spokes 204 that are detected in one revolution of the optical disc 100.

Therefore, the following is repeated until the optical mechanism 502 has again detected the predetermined mark on the control feature 108 (614), signifying that one complete revolution of the optical disc 100 has occurred. Specifically, in response to the rotary encoder 506C of the optical disc device 500 detecting one of the encoder spokes 204 (616), the counter is incremented (618). Thus, where all the encoder spokes 204 on the control feature area 108 are detectable, the counter is ultimately incremented to a value equal to the total number of encoder spokes 204 during one complete revolution of the optical disc 100 within the optical disc device 500.

Thereafter, the counter is copied to a temporary variable (622), and this temporary variable is compared to a predetermined value (624), which as has been described in relation to the method 400, may be the number of encoder spokes 204 actually on the control feature area 108. Parts 622 and 624 can be considered as the counter itself being compared to the predetermined value. However, copying the counter to a temporary variable and comparing this temporary variable to the predetermined value may be advantageous so that during the next revolution of the optical disc 100, parts 612, 614, 616, and 618 can be performed again, at the same time parts 622, 624, 626, 628, 630, 632, and/or 634 are performed. That is, counting the detectable number of encoder spokes 204 again can immediately continue in parts 616 and 618 with the next revolution of the optical disc 100 within the optical disc device 500.

If the temporary variable is unequal to the predetermined value (626), then the method 600 indicates that the optical disc 100 inserted within the optical disc device 500 is faulty, and is unable to have an image properly formed thereon (628). Therefore, as has been described, the user quickly learns that an image will not be able to be properly formed on the optical disc 100 in question. In other words, the user does not have to wait for the image formation process to be completed—since, indeed, it has not yet been started—to learn that the results of this process will be an improperly formed image on the optical disc 100. More generally, part 628 indicates that an error condition has occurred within respect to the optically writable label surface of the optical disc.

By comparison, if the temporary variable is equal to the predetermined value (626), then the repetition counter is incremented, or increased (630). If the repetition counter is not yet equal to a second predetermined value (632), corresponding to the number of times that the proper number of encoder spokes 204 can be detected within the control feature area 108, then the method 600 is repeated at part 612. Once the repetition counter is incremented equal to the second predetermined value (632), then the image formation process can begin. The image formation process is likely to result in a properly formed image on the optically writable label surface 106 of the label side 104 of the optical disc 100, insofar as it has already been determined that the encoder spokes 204 can be properly and robustly detected.

We claim:

1. A method for determining whether an optically writable label surface of an optical disc is suitable for having an image formed thereon, comprising:
    counting a detectable number of encoder spokes on a control feature area of the optical disc as the optical disc is rotated; and,
    where the detectable number of encoder spokes is other than a predetermined value, indicating an error condition with respect to the optically writable label surface of the optical disc.

2. The method of claim 1, further comprising, where the detectable number of encoder spokes is equal to the predetermined value, proceeding to form the image on the optically writable label surface of the optical disc.

3. The method of claim 1, further comprising, where the detectable number of encoder spokes is equal to the predetermined value,
    increasing a repetition counter;
    where the repetition counter is equal to a second predetermined value, proceeding to form the image on the optically writable label surface of the optical disc; and,
    where the repetition counter is less than the second predetermined value, repeating the method of claim 1.

4. The method of claim 1, wherein counting the detectable number of encoder spokes on the control feature area of the optical disc comprises counting the detectable number of encoder spokes on the control feature area of the optical disc during a complete revolution of the optical disc.

5. The method of claim 4, wherein the complete revolution of the optical disc is signaled by detection of a predetermined mark on the control feature area of the optical disc.

6. The method of claim 1, wherein counting the detectable number of encoder spokes on the control feature area of the optical disc comprises:
    detecting the encoder spokes on the control feature area of the optical disc by an encoder of an optical disc device in which the optical disc has been inserted; and
    each of a plurality of times the encoder has detected one of the encoder spokes, increasing a counter.

7. The method of claim 6, further comprising, prior to forming the image on the optically writable label surface of the optical disc, comparing the counter to the predetermined value.

8. The method of claim 1, further comprising, prior to forming the image on the optically writable label surface of the optical disc:
    positioning an optical mechanism of an optical disc device incident to the control feature area of the optical disc; and,
    the optical mechanism detecting a predetermined mark on the control feature area of the optical disc.

9. The method of claim 8, wherein counting the detectable number of encoder spokes on the control feature area of the optical disc comprises counting the detectable number of encoder spokes on the control feature area of the optical disc between successive detections of the predetermined mark by the optical mechanism.

10. The method of claim 9, wherein counting the detectable number of encoder spokes on the control feature area of the optical disc between successive detections of the predetermined mark by the optical mechanism comprises:
    detecting the encoder spokes on the control feature area of the optical disc by an encoder of the optical disc device; and
    each of a plurality of times the encoder has detected one of the encoder spokes, increasing a counter.

11. The method of claim 8, wherein the optical mechanism detecting the predetermined mark on the control feature area of the optical disc comprises the optical mechanism detecting an index mark on the control feature area of the optical disc.

12. A method for determining whether an optically writable label surface of an optical disc is suitable for having an image formed thereon, comprising:
    rotating the optical disc;
    positioning an optical mechanism incident to a control feature area of the optical disc;
    resetting a counter;
    in response to the optical mechanism detecting a predetermined mark on the control feature area of the optical disc, repeating:

detecting an encoder spoke on the control feature area of the optical disc by an encoder of the optical disc device;

in response to the encoder detecting an encoder spoke on the control feature area of the optical disc, incrementing the counter, until the optical mechanism has again detected the predetermined mark on the control feature area of the optical disc;

comparing the counter to a predetermined value; and, where the counter is other than the predetermined value, indicating an error condition with respect to the optically writable label surface of the optical disc.

13. The method of claim 12, wherein comparing the counter to the predetermined value comprises:

copying the counter to a temporary variable; and, comparing the temporary variable to the predetermined value.

14. The method of claim 12, further comprising, where the counter is equal to the predetermined value, increasing a repetition counter;

where the repetition counter is equal to a second predetermined value, proceeding to form the image on the optically writable label surface of the optical disc; and, where the repetition counter is less than the second predetermined value, repeating the method of claim 12 at resetting of the counter.

15. The method of claim 12, wherein the optical mechanism detecting the predetermined mark on the control feature area of the optical disc comprises the optical mechanism detecting an index mark on the control feature area of the optical disc.

16. An optical disc device comprising:

an optical mechanism to form an image on an optically writable label surface of an optical disc inserted into the optical disc device;

an encoder to detect encoder spokes on a control feature area of the optical disc as the optical disc is rotated; and, a controller to determine whether the encoder is able to detect a predetermined number of the encoder spokes on the control feature area of the optical disc to determine whether the optically writable label surface of the optical disc is suitable for having the image formed thereon.

17. The optical disc device of claim 16, wherein the controller is to prevent the optical mechanism from forming the image on the optically writable label surface of the optical disc where the encoder is unable to detect the predetermined number of the encoder spokes on the control feature area of the optical disc a predetermined one or more times.

18. The optical disc device of claim 17, wherein the controller is to permit the optical mechanism to form the image on the optically writable label surface of the optical disc where the encoder is able to detect the predetermined number of the encoder spokes on the control feature of the optical disc the predetermined one or more times.

19. The optical disc device of claim 16, wherein during formation of the image on the optically writable label surface of the optical disc, the encoder spokes are used to angularly position the optical mechanism in relation to the optical disc.

20. The optical disc device of claim 16, wherein the controller comprises firmware.

* * * * *